United States Patent
Kepler

(10) Patent No.: US 6,890,035 B2
(45) Date of Patent: May 10, 2005

(54) DISC RECLINER DUMP LOCK

(75) Inventor: Brian Delane Kepler, Livonia, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/362,898

(22) PCT Filed: Jul. 1, 2002

(86) PCT No.: PCT/US02/20793

§ 371 (c)(1),
(2), (4) Date: Aug. 11, 2003

(87) PCT Pub. No.: WO03/006274

PCT Pub. Date: Jan. 23, 2003

(65) Prior Publication Data

US 2004/0041454 A1 Mar. 4, 2004

Related U.S. Application Data

(60) Provisional application No. 60/302,009, filed on Jun. 29, 2001.

(51) Int. Cl.[7] ............................................. B60N 2/20
(52) U.S. Cl. .................................................. 297/378.12
(58) Field of Search ............................. 297/362, 367, 297/378.12

(56) References Cited

U.S. PATENT DOCUMENTS 4,082,352 A    4/1978  Bales et al.
4,401,344 A  * 8/1983  Chihara et al. .............. 297/367
5,052,748 A   10/1991  Fourrey et al.
6,312,053 B1 * 11/2001 Magyar ........................ 297/367
6,454,355 B2 * 9/2002  Biletskiy ................ 297/378.12

FOREIGN PATENT DOCUMENTS

DE         3608858 A1  * 10/1987
DE       195 23 254 A1   6/1995
EP         0770514 A1   10/1996
FR         2 781 436    7/1998
FR         2 811 947    7/2000

* cited by examiner

Primary Examiner—Peter M. Cuomo
Assistant Examiner—Joseph Edell
(74) Attorney, Agent, or Firm—Clark Hill PLC

(57) ABSTRACT

A recliner mechanism for providing selective locking and adjustment of a seat back relative to a seat cushion between a plurality of reclined seating positions and a stowed position An input shaft is rotatably journaled to the recliner assembly between unreleased and released positions for actuating the recliner assembly between locked and unlocked states, respectively. A first trigger is rotatably assembled to the seat cushion and movable between first and second positions engagable with the input shaft in the released position for maintaining the recliner mechanism in the unlocked state during movement of the seat back between the plurality of reclined seating positions and the stowed position.

10 Claims, 6 Drawing Sheets

DISC RECLINER DUMP LOCK

REFERENCE TO RELATED APPLICATIONS

This application is a 371 of PCT/US02/20793 filed Jul. 1, 2002 which claims benefit from the provisional application 60/302,009 filed Jun. 29, 2001.

BACKGROUND OF THE INVENTION

1. Field of the Invention

The present invention relates to an automotive vehicle seat assembly comprising a seat cushion, a seat back, and a recliner assembly operatively interconnecting the seat back and the seat cushion for adjusting the seat back between a plurality of reclined seating positions and a stowed position relative to the seat cushion.

2. Description of the Prior Art

Automotive vehicles include seats assemblies for supporting occupants within the vehicle. Each seat assembly typically comprises a seat cushion, a seat back, and a recliner assembly pivotally interconnecting the seat back and the seat cushion. The recliner assembly allows for selective angular adjustment and locking of the seat back relative to the seat cushion between a plurality of reclined seating positions. A handle and input shaft assembly are commonly utilized to actuate the recliner assembly between locked and unlocked states during angular adjustment of the seat back.

The recliner assembly can be designed to allow adjustment of the seat back between any one of the reclined seating positions and a stowed position. However, recliner assemblies currently utilized in the seating art require a user to continuously maintain the recliner assembly in the unlocked state via the handle while the seat back is adjusted between the reclined seating positions and the stowed position.

Accordingly, there is a need for a seat assembly having a mechanism for controlling the recliner assembly during adjustment of the seat back between the reclined seating positions and the stowed position so that the user does not need to manually hold the recliner assembly in the unlocked state. Further, such a mechanism must not interfere with the regular operation of the recliner assembly during adjustment between the various reclined seating positions.

SUMMARY OF THE INVENTION

According to one aspect of the invention, a recliner mechanism is provided for allowing selective locking and pivotal adjustment of a seat back relative to a seat cushion. The recliner mechanism includes a fixed flange fixedly secured to the seat cushion and a mobile flange fixedly secured to the seat back and pivotally coupled to the fixed flange for allowing pivotal movement of the seat back relative to the seat cushion between a plurality of reclined seating positions and a stowed position. A locking mechanism is operatively coupled between the fixed and mobile flanges for selectively locking the fixed and mobile flanges. The locking mechanism is movable between a locked state for locking the seat back in any one of the plurality of reclined seating positions and the stowed position and an unlocked state for allowing pivotal movement of the seat back between the plurality of reclined seating positions and the stowed positions. The locking mechanism includes an input shaft movable between unreleased and released positions for actuating the locking mechanism between the locked and unlocked states, respectively. A first trigger is movably coupled with said recliner mechanism and engagable with said input shaft in said released position for maintaining said recliner mechanism in said unlocked state during movement of said seat back between said plurality of reclined seating positions and said stowed position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
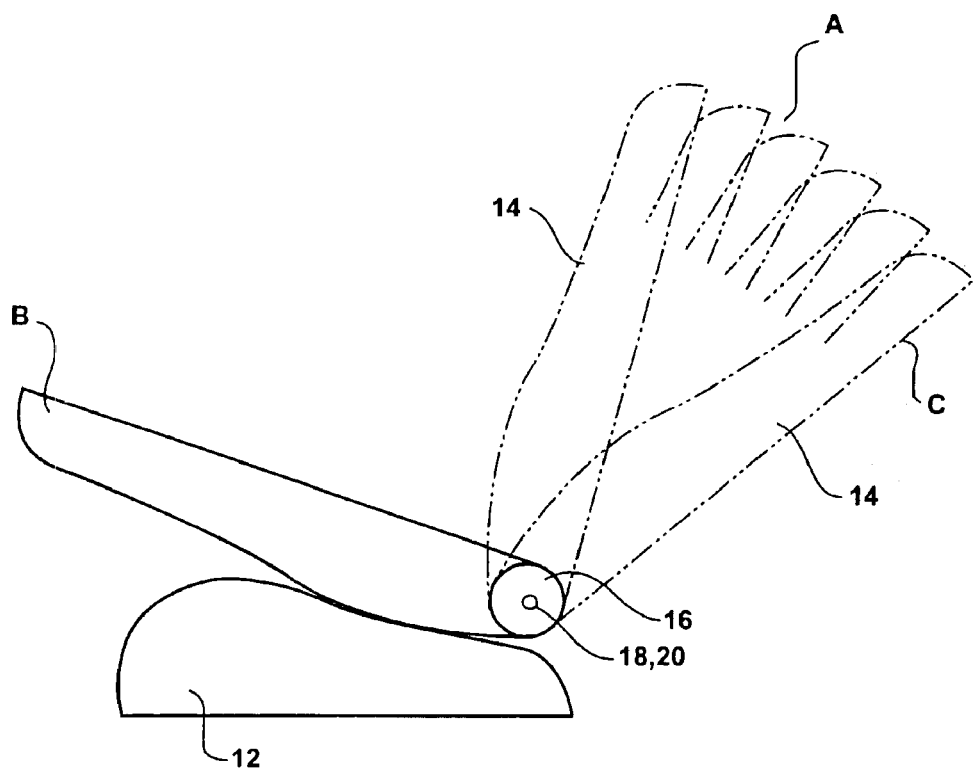
FIG. 1 is a schematic side view of a seat assembly having a seat back, a seat cushion, a recliner assembly, and a mechanism according to the present invention.

Referring to the figures, FIG. 1 shows a seat assembly 10 incorporating the present invention for use in an automotive vehicle. The seat assembly 10 comprises a seat cushion 12 and a seat back 14. A recliner assembly 16 operatively interconnects the seat back 14 and the seat cushion 12. The recliner assembly 16 includes a fixed flange 15 fixedly secured to the seat cushion 12 and a mobile flange 17 fixedly secured to the seat back 14 and pivotally coupled with the fixed flange 15 about a pivot axis 18. The recliner assembly 16 allows selective pivotal adjustment of the seat back 14 relative to the seat cushion 12 between a plurality of reclined seating positions A about the pivot axis 18. The recliner assembly 16 includes a locking mechanism (not shown) movable between locked and unlocked states. In the locked state, the locking mechanism maintains the angular position of the seat back 14 relative to the seat cushion 12 by locking the fixed and mobile flanges 15, 17. In the unlocked state, the mobile flange 17 is freely pivotable relative to the fixed flange 15 for allowing pivotal movement of the seat back 14 relative to the seat cushion 12. The locking mechanism is biased toward the locked state by any suitable means, such as a coil spring. An input shaft 20 axially disposed along the pivot axis 18 is operatively coupled to the locking mechanism for pivotal movement between unreleased and released positions for actuating the locking. mechanism between the locked and unlocked positions, respectively. Further detailed description and operation of the recliner mechanism 16 is fully set forth in applicant's co-pending PCT application CA 99/00653, published Feb. 10, 2000, which is incorporated herein by reference in its entirety. Described in further detail below, the recliner mechanism 16 includes a mechanism for actuating and holding the recliner assembly 16 in the unlocked state to allow the seat back 14 to pivot between any one of the reclined seating positions and a forwardly stowed position B. The mechanism allows the recliner to return to the locked state when the seat back 14 reaches the forwardly stowed position B. With the seat back 14 in the forwardly stowed position, the recliner assembly 16 can be actuated and held in the unlocked state so that the seat may be returned to a default reclined seating position C. The mechanism does not interfere with adjustment of the seat back 14 between the plurality of reclined seating positions.

Figure 2:
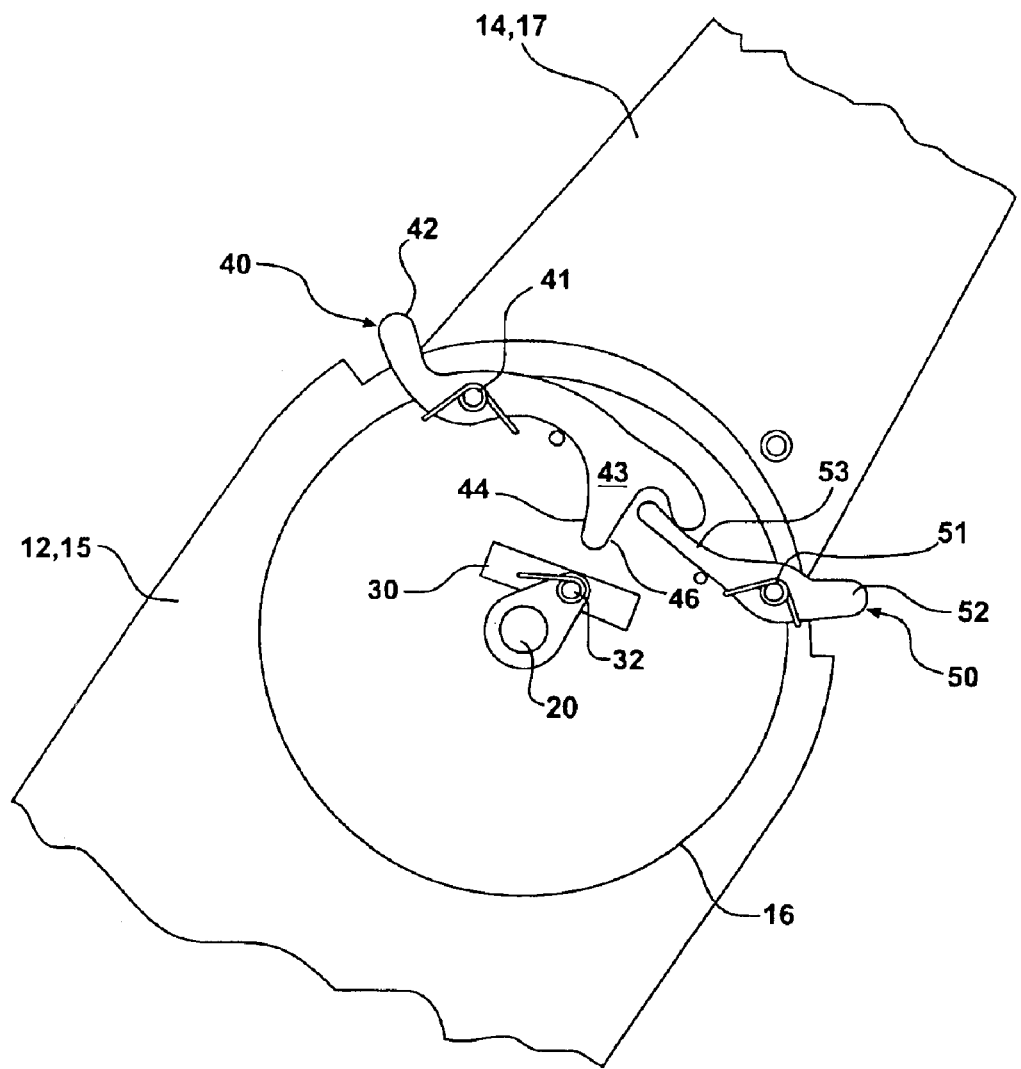
FIG. 2 is a side view of the mechanism according to the present invention with the recliner mechanism in a locked state.
Figure 3:
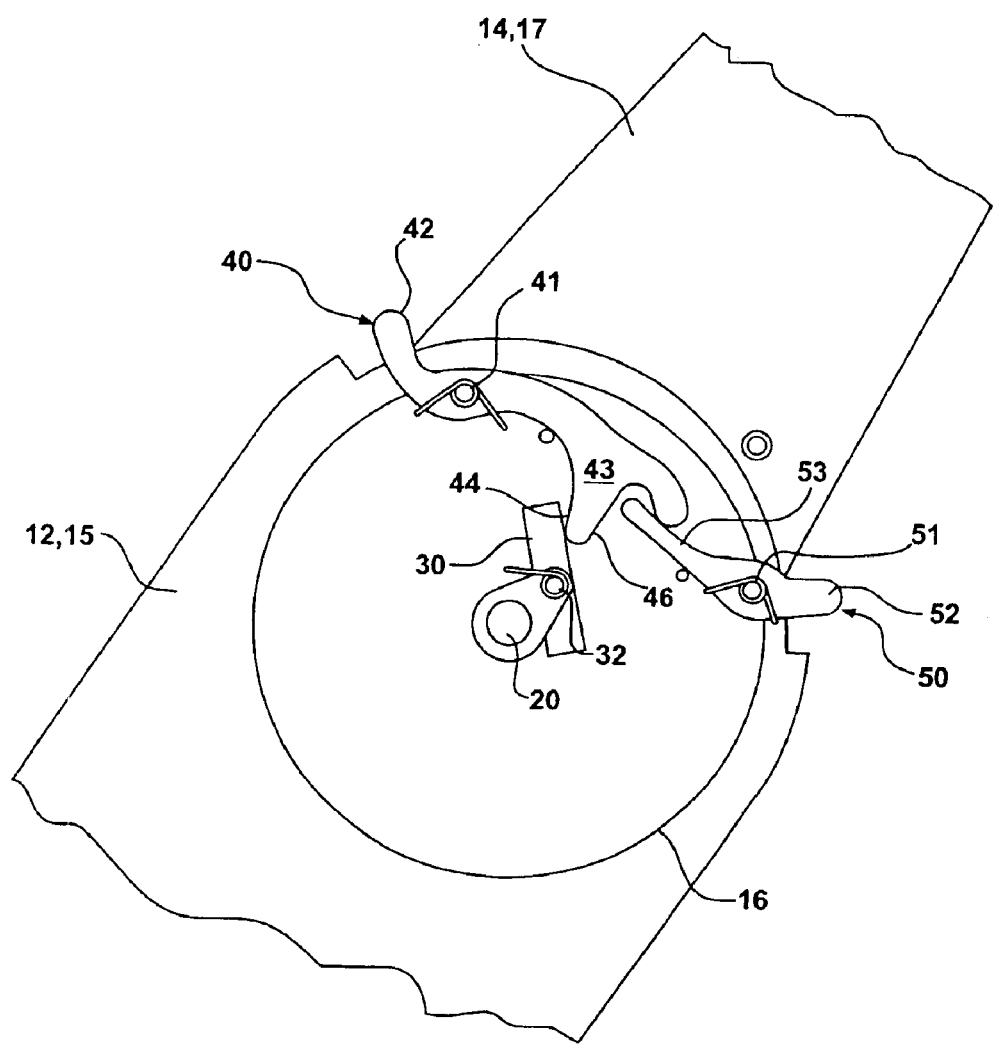
FIG. 3 is a side view of the mechanism according to the present invention with the recliner mechanism in the locked state just prior to actuation to an unlocked state.

Referring to FIG. 2, a lever arm 30 is pivotally mounted to a portion of the input shaft 20 for movement between a retracted or first position, as shown in FIG. 2, and an extended or second position, as shown in FIG. 3. The lever arm 30 is biased in a counterclockwise direction, as viewed in the figures, toward the first position by any suitable biasing member 32, such as a coil spring extending between the lever arm 30 and the input shaft 20. It should be appreciated that the spring rate of the biasing member 32 is sufficient to bias the lever arm 30 toward the first position, but not high enough to overcome the bias of the recliner assembly 16 toward the locked state when the lever arm 30 is rotated between the first and second positions. The lever arm 30 can be actuated by a cable extending between the lever arm 30 and a release lever rotatably mounted to the seat cushion 12, as commonly known to one skilled in the art.

A first trigger 40 is pivotally assembled to the seat cushion 12 or the fixed flange 15 by a pivot pin 41. The first trigger 40 is movable between a first position, shown in FIG. 2, and a second position, shown in FIG. 5. The first trigger 40 is biased toward the first position by any suitable biasing means, such as a helical coil spring extending between the seat cushion 12 and the first trigger 40. The first trigger 40 has a tab 42 extending outwardly from the pivot pin 41 to engage a portion of the seat back 14 when the seat back 14 is adjusted to the forwardly stowed position B. An arm 43 extends from the first trigger 40 toward the input shaft 20. The arm 43 includes a cam surface 44 and an opposite stop surface 46. While the first trigger is in the first position, the cam surface 44 is presented for engaging the lever arm 30 when the lever arm 30 is in the Second position and the input shaft 20 is rotated between the unreleased and released positions. FIG. 3 illustrates the engagement of the cam surface 44 with the lever arm 30 just prior to rotation of the input shaft 20 to the released position. The stop surface 46 engages the lever arm 30 when the lever arm 30 is in its second position and the input shaft 20 is moved into the released position. The stop surface 46, while engaged with the lever arm 30, maintains the input shaft 20 in the released position, and in turn, the recliner assembly 16 in the unlocked state. More specifically, the stop surface 46 is oriented such that force applied by the biasing member 32 is directed through the pivot pin 41, so that there is substantially no rotational moment of the first trigger 40 about the pivot pin 41. Alternatively, force applied by the biasing member 32 could be directed to cause a clockwise rotational moment, as viewed in the figures, of the first trigger 40 about the pivot pin 41 against any suitable stopping means formed in or secured to the seat cushion 12 or fixed flange 15, such as a punched tab or pin, in order to maintain the first trigger 40 in the first position.

Figure 6:
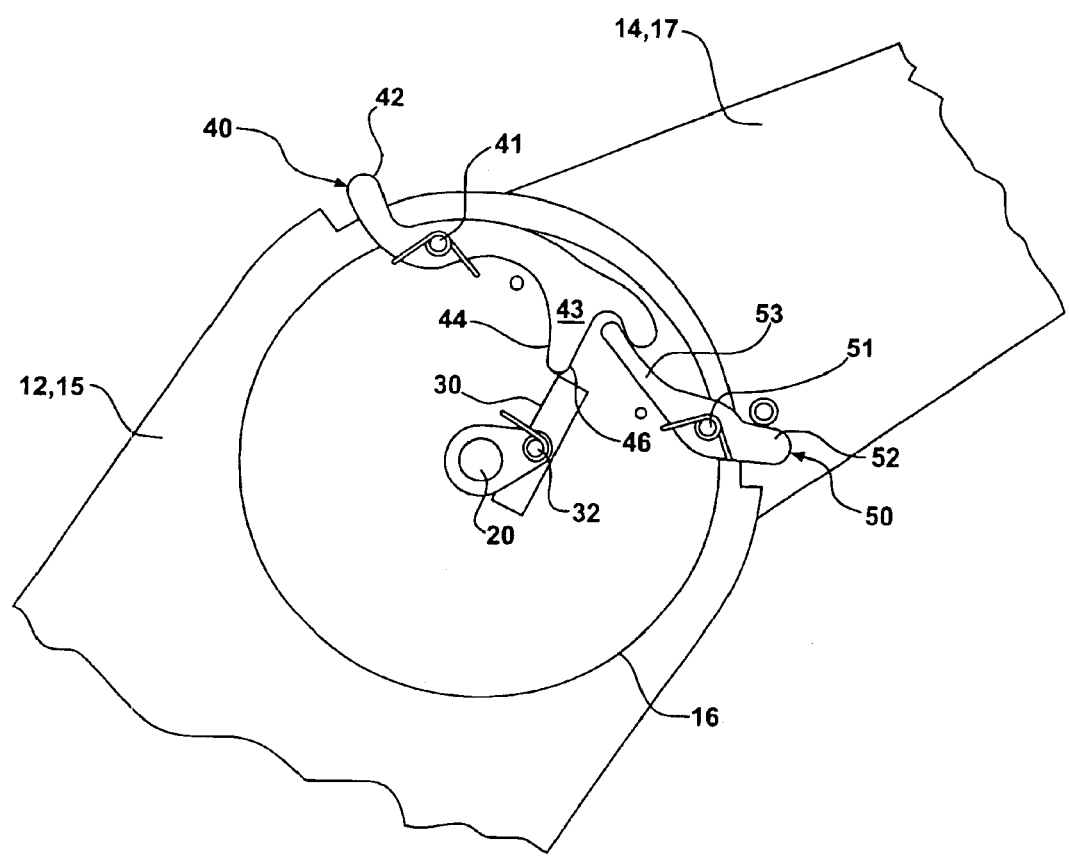
FIG. 6 is a side view of the mechanism according to the present invention with the recliner mechanism just prior to returning to the locked state as the seat back is rotated to a default reclined seating position.

A second trigger 50 is pivotally mounted to the seat cushion 12 or fixed flange 15 by a pivot pin 51 for movement between a first position, shown in FIG. 2, and a second position, shown in FIG. 6. The second trigger 50 is biased toward the first position by any suitable biasing means, such as a helical coil spring extending between the cushion and the second trigger 50. The second trigger 50 includes an arm 53 for actuating the first trigger 40 between the first and second positions during rotation of the first trigger between its respective first and second positions. The second trigger 50 has a tab 52 extending outwardly from the pivot pin 51. The tab 52 engages a portion of the seat back 14 as the seat back 14 is returned from the forwardly stowed position B to the default reclined seating position C. Motion of the seat back 14 to the default reclined seating position C causes clockwise rotation, as viewed in the figures, of the second trigger 50 to the second position. The first trigger 40 rotates counterclockwise toward its second position in response to the clockwise motion of the second trigger 50. Generally, the rotational movements of both the first and second triggers 40, 50 between their respective first and second positions are synchronized by the interaction of the arm 53 with the first trigger 40, and vice versa.

To adjust the seat back 14 between the reclined seating positions A, the input shaft 20 is rotated clockwise to the released position for actuating the recliner assembly 16 to the unlocked state. With the recliner assembly 16 in the unlocked state, the seat back 14 freely rotates relative to the seat cushion 12. Once the seat back 14 has been adjusted to a desired one of the plurality of reclined seating position, the input shaft 20 is allowed to rotate counterclockwise to the unreleased position as the recliner assembly 16, under its internal bias, returns to the locked state. Once the recliner assembly 16 returns to the locked state, the seat back 14 is locked and prevented from rotating relative to the seat cushion 12. During rotation of the input shaft 20 between the unreleased and released positions, there is no relative motion between the lever arm 30 and the input shaft 20 and the lever arm 30 remains spaced apart from arm 43 of the first trigger 40.

Figure 4:
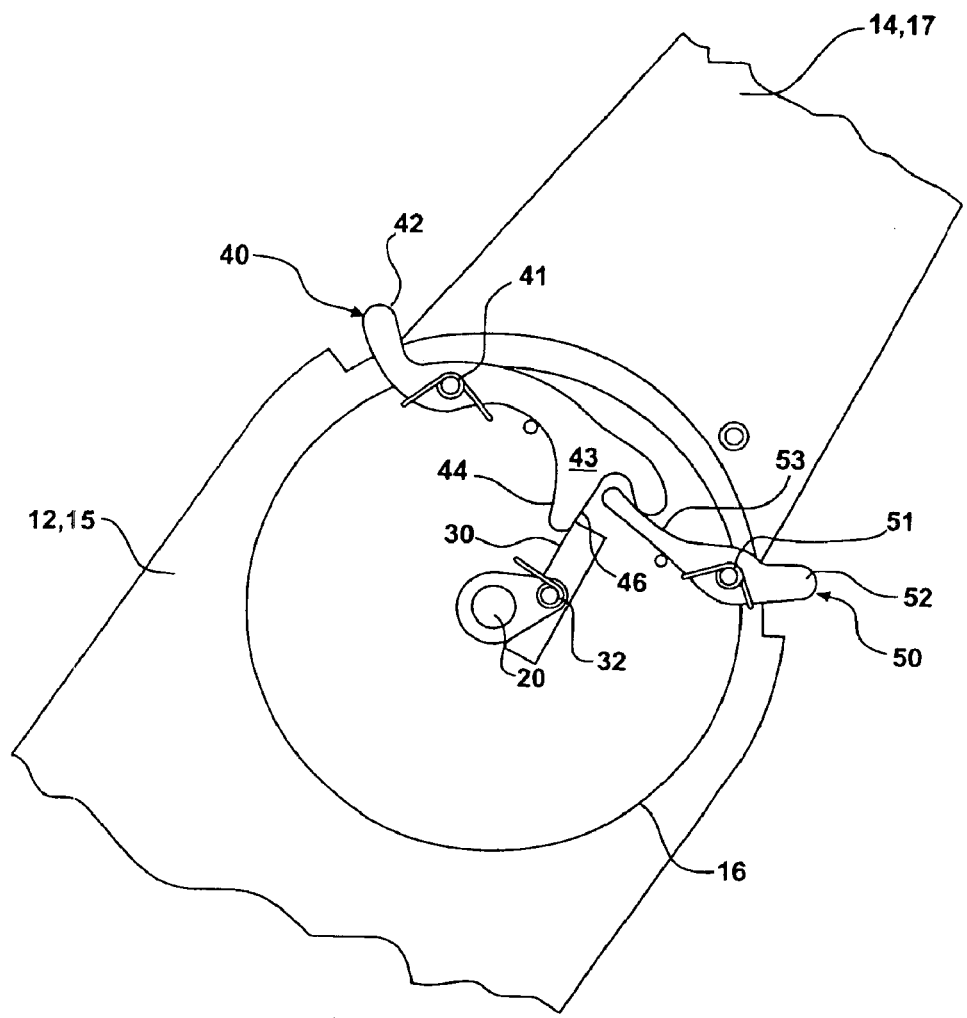
FIG. 4 is a side view of the mechanism according to the present invention with the recliner mechanism held in the unlocked state.
Figure 5:
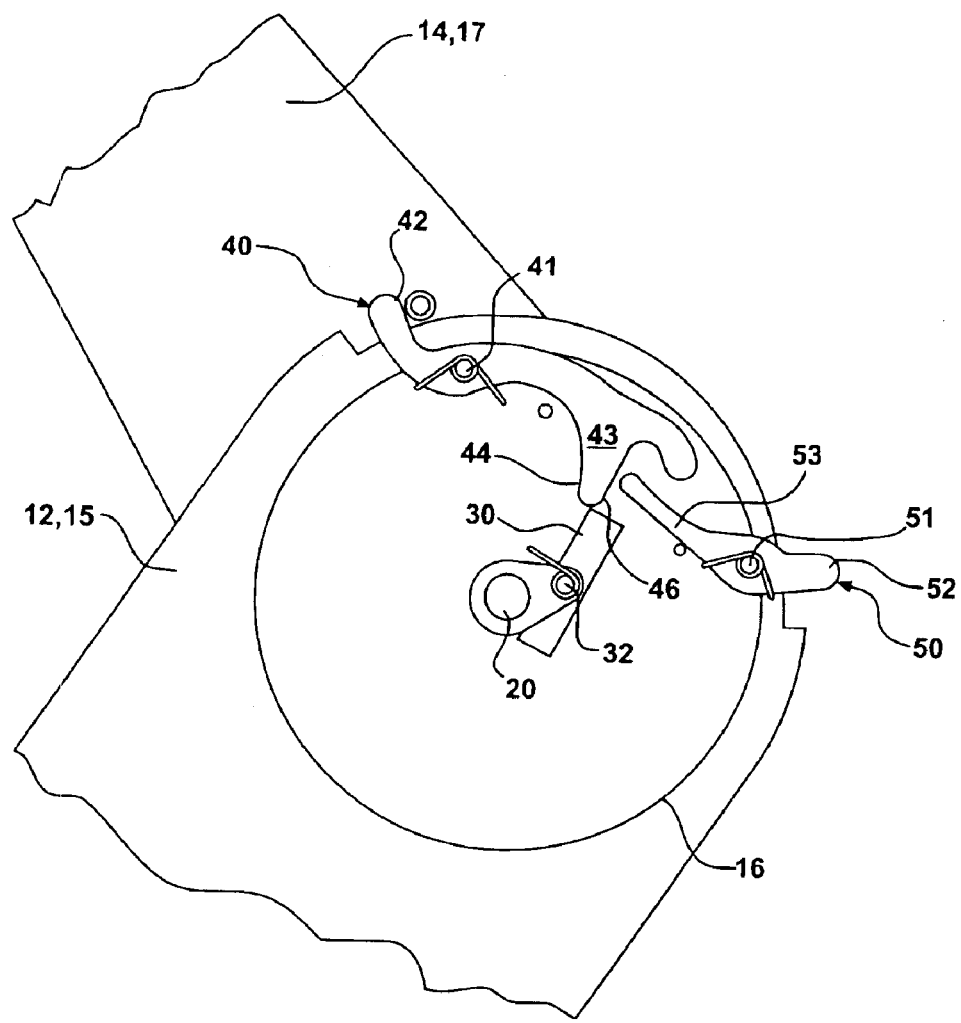
FIG. 5 is a side view of the mechanism according to the present invention with the recliner mechanism just prior to returning to the locked state as the seat back is rotated to a stowed position.

To adjust the seat back 14 between any one of the reclined seating positions A and the forwardly stowed position B, force is applied to the lever arm 30 to cause rotation of the lever arm 30 toward the second position, as shown in FIG. 3. Once the lever arm 30 reaches the second position, continued application of force upon the lever arm 30 causes rotation of input shaft 20 in a clockwise direction toward the released position. Further, once in the second position, the lever arm 30 is presented for engaging the cam surface 44 of the arm 43 of the first trigger 40. As the input shaft 20 continues to rotate toward the released position, the lever arm 30 applies force upon the cam surface 44 causing counterclockwise rotation of the first trigger 40 about the pivot pin 41 to the second position. As shown in FIG. 4, when the input shaft 20 reaches the released position, the lever arm 30 slides past the cam surface 44 and the first trigger returns to the first position. The lever arm 30 engages the stop surface 46 of the arm 43. The stop surface 44 while engaged with the lever arm 30 maintains the input shaft 20 in the released position, and in turn, the recliner assembly 16 in the unlocked state. The seat back 14 is then freely rotated between the plurality of reclined seating positions and the forwardly stowed position B. As shown in FIG. 5, when the seat back 14 reaches the forwardly stowed position B, a portion of the seat back 14 contacts the tab 42 so that continued rotation of the seat back 14 toward the forwardly stowed position B causes the first trigger 40 to rotate counterclockwise to the second position. The stop surface 46 slides past the lever arm 30 to allow the input shaft 20 to return to the unreleased position, and in turn, the recliner assembly 16 to the locked state. The seat back 14, while in the forwardly stowed position B, holds the first trigger 40 in the second position to allow the lever arm 30 to return to the first position. The seat back 14 is locked in the forwardly stowed position B.

To return the seat back 14 to the default reclined seating position C, the lever arm 30 is rotated to the second position and the input shaft 20 is rotated to the released position. Rotation of the input shaft 20 to the released position actuates the recliner assembly 16 to the unlocked state. The seat back 14 is then freely rotated from the forwardly stowed position B toward the default reclined seating position C. As the seat back 14 pulls away from the tab 42, the first trigger 40 is allowed to return to the first position. The lever arm 30 engages the stop surface 46, thereby holding the input shaft 20 in the released position, and in turn, the recliner assembly 16 in the unlocked state. As the seat back 14 approaches the default reclined seating position C, the seat back 14 engages the tab 52 of the second trigger 50. Continued rotation of the seat back 14 toward the default reclined seating position C causes the second trigger 50 to rotate clockwise toward the second position, as shown in FIG. 6. The arm 53 of the second trigger 50 actuates the first trigger 40 to cause the first trigger 40 to rotate counterclockwise toward the second position. Thus, rotation of the seat back 14, through its engagement with the tab 52, causes generally synchronous rotation of both the first and second triggers 40, 50 toward the respective second positions. The stop surface 46 slides out of engagement with the lever arm 30 to allow the lever arm 30 to return to the first position and the input shaft 20 to return to the unreleased position. The recliner assembly 16 returns to the locked state and locks the seat back 14 in the default reclined seating position C. At this point, the seat back 14 may again be adjusted between the reclined seating positions A or the forwardly stowed position B, as described above.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A recliner mechanism for allowing selective locking and pivotal adjustment of a seat back relative to a seat cushion, said recliner mechanism comprising:

a fixed flange fixedly secured to the seat cushion;

a mobile flange fixedly secured to the seat back and pivotally coupled to said fixed flange for allowing pivotal movement of the seat back relative to the seat cushion between a plurality of reclined seating positions and a stowed position;

an input shaft operatively coupled between said fixed and mobile flanges and movable between unreleased and released positions for selectively actuating said recliner mechanism between a locked state for locking said seat back in any one of said plurality of reclined seating positions and said stowed position and an unlocked state for allowing pivotal movement of said seat back between said plurality of reclined seating positions and said stowed position a first trigger movably coupled with said recliner mechanism and engagable with said input shaft in said released position for maintaining said recliner mechanism in said unlocked state during movement of said seat back between said plurality of reclined seating positions and said stowed position;

a lever arm engagable with said first trigger and pivotally assembled to said input shaft for movement between a retracted position against said input shaft and disengaged from said first trigger and an extended position projecting outwardly from said input shaft and presented for engaging said first trigger to maintain said input shaft in said released position during movement of said seat back between said plurality of reclined seating positions and said stowed position wherein said first trigger is pivotally coupled to said recliner mechanism for movement between a first position presented for engaging said lever arm in said extended position for maintaining said input shaft in said released position during movement of said seat back between said plurality of reclined seating positions and said stowed position and a second position disengaged from said lever arm to allow movement of said input shaft between said unreleased and released positions; and wherein said first trigger includes a tab engagable with said seat back for moving said first trigger between said first and second positions in response to disengagement and engagement of the seat back with said tab.

2. A recliner mechanism as set forth in claim 1 wherein said first trigger includes a cam surface engagable with said lever arm in said extended position for moving said first trigger between said respective first and second positions in response to movement of said input shaft between said unreleased and released positions, respectively.

3. A recliner mechanism as set forth in claim 2 wherein said first trigger includes a stop surface engagable with said lever arm in said extended position for maintaining said input shaft in said released positions during movement of said seat back between said plurality of reclined seating positions and said stowed position.

4. A recliner mechanism as set forth in claim 3 a second trigger operatively coupled between said first trigger and the seat back for moving said first trigger between said first and second positions in response to movement of said second trigger caused by disengagement and engagement of said seat back with said second trigger.

5. A recliner mechanism as set forth in claim 4 wherein said second trigger is pivotally coupled to said recliner mechanism and engagable with said first trigger for moving said first trigger between said first and second positions in response to pivotal movement of said second trigger caused by disengagement and engagement of said seat back with said second trigger.

6. A recliner mechanism as set forth in claim 5 wherein said second trigger includes an arm engagable with said first trigger for moving said first trigger between said first and second positions in response to pivotal movement of said second trigger caused by disengagement and engagement of said seat back with said second trigger.

7. A recliner mechanism as set forth in claim 6 wherein said second trigger includes a tab presented for engaging said seat back for moving said first trigger between said first and second positions in response to pivotal movement of said second trigger caused by disengagement and engagement of said seat back with said tab of said second trigger.

8. A recliner mechanism as set forth in claim 7 including a biasing member for biasing said first trigger toward said first position.

9. A recliner mechanism as set forth in claim 8 including a biasing member extending between said input shaft and said lever arm for biasing said lever arm toward said retracted position.

10. A recliner mechanism as set forth in claim 9 including a biasing member for biasing said second trigger out of engagement with said first trigger to allow movement of said first trigger between said first and second positions.

* * * * *